(12) United States Patent
Russell (10) Patent No.: US 10,217,189 B2
(45) Date of Patent: Feb. 26, 2019

(54) GENERAL SPHERICAL CAPTURE METHODS

(71) Applicant: Google Inc., Mountain View, CA (US)

(72) Inventor: Andrew Ian Russell, San Jose, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 15/266,602

(22) Filed: Sep. 15, 2016

(65) Prior Publication Data

US 2017/0076429 A1    Mar. 16, 2017

Related U.S. Application Data (60) Provisional application No. 62/219,534, filed on Sep. 16, 2015.

(51) Int. Cl.
*H04N 7/00* (2011.01)
*G06T 3/40* (2006.01)
(Continued)

(52) U.S. Cl.
CPC .......... *G06T 3/4038* (2013.01); *G02B 27/017* (2013.01); *G03B 37/04* (2013.01);
(Continued)

(58) Field of Classification Search
CPC .......... G06T 7/33; G06F 15/167; H04N 13/04
(Continued)

(56) References Cited

U.S. PATENT DOCUMENTS 5,703,604 A    12/1997 McCutchen et al.
5,986,668 A *  11/1999 Szeliski .................... G06T 7/33
                                                    345/634
(Continued)

FOREIGN PATENT DOCUMENTS

EP    2821969 A1    1/2015
EP    3007038 A2    4/2016
(Continued)

OTHER PUBLICATIONS

International Search Report and Written Opinion for PCT Application No. PCT/US2016/52086, dated Dec. 5, 2016, 17 pages.
(Continued)

*Primary Examiner* — Gims S Philippe
(74) *Attorney, Agent, or Firm* — Brake Hughes Bellermann LLP (57) ABSTRACT

Systems and methods are described for capturing spherical content. The systems and methods can include determining a region within a plurality of images captured with a plurality of cameras in which to transform two-dimensional data into three-dimensional data, calculating a depth value for a portion of pixels in the region, generating a spherical image, the spherical image including image data for the portion of pixels in the region, constructing, using the image data, a three-dimensional surface in three-dimensional space of a computer graphics object generated by an image processing system, generating, using the image data, a texture mapping to a surface of the computer graphics object, and transmitting the spherical image and the texture mapping for display in a head-mounted display device.

20 Claims, 6 Drawing Sheets

(51) Int. Cl.
| | |
|---|---|
| *H04N 5/247* | (2006.01) |
| *H04N 13/111* | (2018.01) |
| *H04N 13/271* | (2018.01) |
| *H04N 13/344* | (2018.01) |
| *G03B 37/04* | (2006.01) |
| *H04N 5/232* | (2006.01) |
| *G02B 27/01* | (2006.01) |
| *H04N 13/243* | (2018.01) |
| *H04N 13/117* | (2018.01) |
| *H04N 13/239* | (2018.01) |
| *H04N 13/128* | (2018.01) |
| *H04N 13/261* | (2018.01) |

(52) U.S. Cl.
CPC ......... *H04N 5/23238* (2013.01); *H04N 5/247* (2013.01); *H04N 13/111* (2018.05); *H04N 13/117* (2018.05); *H04N 13/128* (2018.05); *H04N 13/239* (2018.05); *H04N 13/243* (2018.05); *H04N 13/261* (2018.05); *H04N 13/271* (2018.05); *H04N 13/344* (2018.05); *G02B 2027/014* (2013.01); *G02B 2027/0134* (2013.01); *G02B 2027/0138* (2013.01); *G02B 2027/0187* (2013.01); *H04N 2213/001* (2013.01)

(58) Field of Classification Search
USPC .......................... 348/38; 345/634, 502, 419
See application file for complete search history.

(56) References Cited

U.S. PATENT DOCUMENTS

| | | | |
|---|---|---|---|
| 7,619,629 B1* | 11/2009 | Danilak | ................ G06F 15/167 |
| | | | 345/502 |
| 2003/0117488 A1 | 6/2003 | Pierce et al. | |
| 2010/0110068 A1* | 5/2010 | Yamauchi | ............ H04N 13/004 |
| | | | 345/419 |
| 2013/0044108 A1 | 2/2013 | Tanaka et al. | |
| 2016/0088280 A1 | 3/2016 | Sadi et al. | |
| 2017/0363949 A1 | 12/2017 | Valente et al. | |

FOREIGN PATENT DOCUMENTS

| | | |
|---|---|---|
| KR | 20170017700 A | 2/2017 |
| WO | 0244808 A2 | 6/2002 |
| WO | 2017026705 A1 | 2/2017 |

OTHER PUBLICATIONS

Examination Report under Section 18(3) for United Kingdom Application No. 1716679.4, dated Jun. 7, 2018, 6 pages.

* cited by examiner

GENERAL SPHERICAL CAPTURE METHODS

CROSS-REFERENCE TO RELATED APPLICATION

This application claims priority to and the benefit of U.S. Patent Application Ser. No. 62/219,534, entitled "General Spherical Capture Methods," filed on Sep. 16, 2015, the disclosure of which is incorporated herein by reference.

TECHNICAL FIELD

This description generally relates to methods and devices for capturing and processing two-dimensional (2D) and three-dimensional (3D) images.

BACKGROUND

Spherical images can provide a view of 360 degrees of a scene. Such images can be captured and defined using a particular projection format. For example, spherical images may be defined in an equirectangular projection format to provide a single image with a 2:1 aspect ratio with respect to the width and height of the image. In another example, spherical images may be defined in a cubic projection format to provide an image remapped to six faces of a cube.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the instructions may include a computer-implemented method that includes determining a region within a plurality of images captured with a plurality of cameras in which to transform two-dimensional data into three-dimensional data. Determining a region in which to transform two-dimensional data into three-dimensional data may be performed automatically based at least in part on user input detected at the head-mounted display. The user input may include a head turn and the three-dimensional data may be used to generate a three-dimensional portion in at least one of the plurality of images corresponding to a view. In another example, the user input may include a change in eye gaze direction and the three dimensional data may be used to generate a three dimensional portion in at least one of the plurality of images in a line of sight of the user.

The method may also include calculating a depth value for a portion of pixels in the region and generating a spherical image. The spherical image may include image data for the portion of pixels in the region. In some implementations, the portion of pixels are represented on the surface of the computer graphics object with a radius equal to a corresponding depth value associated with one or more of the portion of pixels in the region. The method my also include constructing, using the image data, a three-dimensional surface in three-dimensional space of a computer graphics object generated by an image processing system and generating, using the image data, a texture mapping to a surface of the computer graphics object. The texture mapping may include a mapping of the image data to the surface of the computer graphics object. The method may also include transmitting the spherical image and the texture mapping for display in a head-mounted display device. Other embodiments of this aspect include corresponding computer systems, apparatus, and computer programs recorded on one or more computer storage devices, each configured to perform the actions of the methods.

In some implementations, the method may also include generating an additional spherical image and texture mapping associated with the region, generating a left eye view by combining a portion of the image data and the spherical image, generating a right eye view by generating additional image data and combining the additional image data and the additional spherical image, and displaying the left eye view and right eye view in the head-mounted display device. The image data may include depth value data and RGB data for at least some of the portion of pixels in the region.

In some implementations, the plurality of images includes video content and the image data includes RGB data and depth value data associated with the portion of pixels. In some implementations, the method further includes converting, using the image data, a two-dimensional version of the region into a three-dimensional version of the region and providing, for display in the head-mounted display device, the three dimensional version of the region. In some implementations, the plurality of images are captured with a plurality of cameras mounted on a spherically shaped camera rig.

In another general aspect, a computer-implemented method is described that include obtaining a plurality of images with a plurality of cameras, generating at least two updated images for the plurality of images in which the at least two updated images generated by interpolating a viewpoint for at least one virtual camera configured to capture content in a leftward offset from a predefined centerline and to capture content in a rightward offset from the predefined centerline. In some implementations, interpolating a viewpoint includes sampling a plurality of pixels in the plurality of images, generating virtual content using optical flow, and placing the virtual content within at least one of the at least two updated images.

The method may further include mapping a first image in the at least two updated images to a first spherical surface to generate a first spherical image for provision to a left eyepiece of a head mounted display, mapping a second image in the at least two updated images to a second spherical surface to generate a second spherical image for provision to a right eyepiece of the head mounted display, and displaying the first spherical image in the left eyepiece of the head mounted display and displaying the second spherical image in the right eyepiece of the head mounted display.

In some implementations, the at least one virtual camera is configured to use content captured using one or more physical cameras and adapt the content to be provided from the viewpoint. In some implementations, the mapping of the first image includes applying a texture to the first image by assigning pixel coordinates from the first image to the first spherical surface and the mapping of the second image includes applying a texture to the second image by assigning pixel coordinates from the second image to the second spherical surface.

In some implementations, the at least two spherical images include an RGB image having at least a portion of the plurality of pixels included in the content captured in the leftward offset and an RGB image having at least a portion of the plurality of pixels included in the content captured in the rightward offset. In some implementations, the leftward offset and the rightward offset are modifiable and are functional to adapt a display accuracy of the first image and the second image in the head mounted display.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Acquiring image content that can be used to accurately reproduce each portion of a scene in two dimensions and/or in three dimensions generally includes capturing images or video of the scene using multiple cameras housed in a three dimensional camera rig. The cameras may be configured to capture each portion of the scene surrounding the camera rig on the top, sides, bottom, and any scene content depicted in-between. The systems and methods described in this disclosure can employ a camera rig that is spherically shaped, icosahedron shaped, or 3D polygon in shape, just to name a few examples. Such a camera rig can be housed with several groups (e.g., triads) of cameras strategically placed on the rig to capture image content pertaining to every outwardly capture-able area surrounding the rig. The image content can include overlapping image content captured between the multiple cameras and this overlap can be used at a later time to generate additional image content, stitch existing image content, or to generate optical effects (e.g., 3D effects) in the image content.

One such optical effect may include producing 3D regions within the image content. Producing 3D regions within image content (e.g., video content) at runtime (or near real time) may be achieved using content captured with the systems and methods described herein because such camera rigs are configured to capture each and every area surrounding a sphere or other 3D shape configured to house the cameras. Having access to all possible viewing content within a scene enables calculations for depth, which can be used to modify 2D content into 3D content and back. One example of producing 3D regions can include determining that a particular area should be shown in 3D based on the objects or action shown in the image content.

For example, if the image content depicts an acrobatic performance shown from a ceiling, the systems and methods described in this disclosure can determine that 3D effects should be applied to content shown above a user in a VR space, for example, when the user looks to the ceiling of the VR space. The 3D effects can be automatically applied to the image content (e.g., video content) and displayed to the user in a VR head mounted display (HMD) device. In some implementations, the 3D effects can be manually configured to shift the area in which to apply 3D effects. For example, the 3D effects in the acrobat example may be shifted from a main stage to the ceiling when the performance is scheduled to move from the stage to the ceiling. That is, the image content (e.g., video content) can be configured to shift the 3D effects to the ceiling as the acrobats begin to perform above the user (e.g., audience). In some implementations, images 3D effects can be applied to a portion of the image content while surrounding portions of the image content remain in a two-dimensional format. In some implementations, the systems described herein can be used to apply 3D effects to an entire image or video. In other implementations, the systems described herein can be used to apply 3D effects to a scene, a portion of a scene, an area in an image/scene, a user selected or user-gaze selected portion of an image/scene.

Modifying image content from two-dimensions (2D) to three-dimensions (3D) can be performed because a spherical camera rig is used to capture images from all angles around the spherical camera rig, thus making all possible areas 3D adjustable. Automatic adjustments can include calculating dense optical flow to calculate depth maps associated with the image content. Calculating depth maps can include calculating a number of depth values representing a distance of various points in a scene relative to a position of a camera. In some examples, two or more images can be used to compute depth values and the depth values in addition to 2D image data can be used to estimate 3D image data for portions of a particular scene.

In some implementations, texture mapping to an object may produce a two dimensional effect of mapping two-dimensional data onto the object. In other implementations, transmitting depth map data (or depth data) and texture map data to a depth surface, the effect may be a three dimensional effect.

The systems and methods described in this disclosure may include using optical flow algorithms, depth map calculations, user input, and/or director input to produce 3D regions within image content. For example, the systems and methods described can apply a 3D effect to selected areas of image content. The 3D effect can be strategically calculated and placed at near real time within image content, such as video content. In some implementations, the 3D effects can be manually placed prior to providing the image content in a virtual reality (VR) space. In some implementations, the 3D effects can be automatically placed while a user is viewing the image content in a VR space, for example, in response to the user turning toward an area of interest. For example, if image content captured with the devices described herein is provided to a user in the VR space, the user can turn toward an area in the VR space to view content and the content can be automatically generated as 3D content in response to the user showing interest in the content.

In particular implementations, the systems and methods described herein can include calculating dense optical flow fields between a number of triads of cameras on a spherical camera rig to configure and display 3D image content. Computing and transmission of flow fields (using optical flow interpolation techniques) can be performed to reconstruct (at run time or prior to run time) particular 3D views that a user may wish to view. The techniques can take into account user head tilting and translating and may allow 3D content to be provided at any selectable area within a scene captured by the spherical camera rig. In some implementations, forward and backward head translating can also be performed.

In some implementations, the systems and methods described herein can employ optical flow and/or stereo matching techniques to obtain a depth value for each pixel of an image. A spherical image (or video), generated using the optical flow and/or stereo matching techniques, can be transmitted to an HMD device, for example. The spherical image may include RGB (Red Green Blue) pixel data, YUV (lumen and chrominance) data, depth data, or additional calculated or obtainable image data. The HMD device can receive such data and render the image as texture mapped onto a surface in 3D space defined by the depth component.

In some implementations, the systems and methods described herein can interpolate a number of different virtual cameras using optical flow techniques. At least two spherical images can be generated using resulting optical flow data (e.g., a left-RGB spherical image and right-RGB spherical image). The pixels in the left-RGB spherical image can be obtained from virtual cameras that are offset to the left and the pixels in the right-RGB spherical image can be obtained from virtual cameras that are offset to the right. In order to generate an accurate 3D effect, the systems and methods described herein can modify the amount of left and right offset used for the virtual cameras. That is, selecting the largest offset can function to provide accurate 3D image content based on the content in the image or video, or based on input from a director. The left and right images can then be texture mapped onto a sphere (of a constant radius) in the HMD device, for example.

Figure 1:
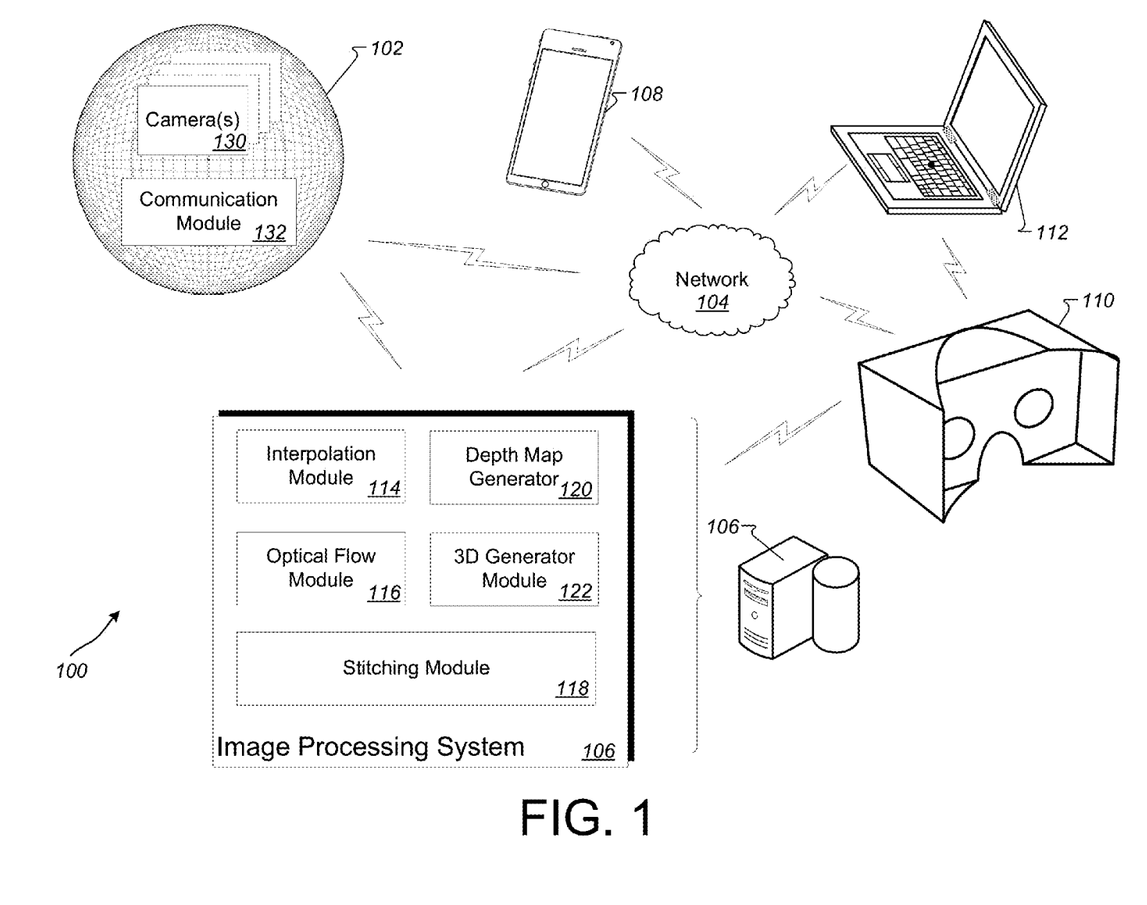
FIG. 1 is a block diagram of an example system 100 for capturing, processing, and rendering 2D and 3D content for a virtual reality (VR) space.

FIG. 1 is a block diagram of an example system 100 for capturing, processing, and rendering 2D and 3D content for a virtual reality (VR) space. In the example system 100, a spherical-shaped camera rig 102 can capture and provide still and video images over a network 104, or alternatively, can provide the images directly to an image processing system 106 for analysis and processing. Once the images are captured, the image processing system 106 can perform a number of calculations and processes on the images and provide the processed images to a head mounted display (HMD) device 110 for rendering over network 104, for example. In some implementations, the image processing system 106 can also provide the processed images to a mobile device 108 and/or to computing device 112 for rendering, storage, or further processing.

The HMD device 110 may represent a virtual reality headset, glasses, eyepiece, or other wearable device capable of displaying virtual reality content. In operation, the HMD device 110 can execute a VR application (not shown) which can playback received and/or processed images to a user. In some implementations, the VR application can be hosted by one or more of the devices 106, 108, or 112, shown in FIG. 1. In one example, the HMD device 110 can generate portions of a scene as 3D video content and can provide video playback of the scene captured by camera rig 102 in a 3D format at strategically selected locations.

The camera rig 102 can be configured for use as a camera (also can be referred to as a capture device) and/or processing device to gather image data for rendering content in a VR space. Although camera rig 102 is shown as a block diagram described with particular functionality herein, rig 102 can take the form of any of the implementations shown in FIGS. 2-4 and additionally may have functionality described for the camera rigs throughout this disclosure. For example, for simplicity in describing the functionality of system 100, FIG. 1 shows the camera rig 102 without cameras disposed around the rig to capture images. Other implementations of camera rig 102 can include any number of cameras that can be disposed at any point on the 3D camera rig, such as rig 102.

As shown in FIG. 1, the camera rig 102 includes a number of cameras 130 and a communication module 132. The cameras 130 can include still or video cameras. In some implementations, the cameras 130 can include multiple still cameras or multiple video cameras disposed (e.g., seated) along the surface of the spherical rig 102. The cameras 130 may include a video camera, an image sensor, a stereoscopic camera, an infrared camera, and/or a mobile device camera. The communication system 132 can be used to upload and download images, instructions, and/or other camera related content. The communication system 132 may be wired or wireless and can interface over a private or public network.

The camera rig 102 can be configured to function as a stationary rig or a rotational rig. Each camera on the rig is disposed (e.g., placed) offset from a center of rotation for the rig. The camera rig 102 can be configured to rotate around 360 degrees to sweep and capture all or a portion of a 360-degree spherical view of a scene, for example. In some implementations, the rig 102 can be configured to operate in a stationary position and in such a configuration, additional cameras can be added to the rig to capture additional outward angles of view for a scene.

In some implementations, the cameras can be configured (e.g., set up) to function synchronously to capture video from the cameras on the camera rig at a specific point in time. In some implementations, the cameras can be configured to function synchronously to capture particular portions of video from one or more of the cameras over a time period. Another example of calibrating the camera rig can include configuring how incoming images are stored. For example, incoming images can be stored as individual frames or video (e.g., .avi files, .mpg files) and such stored images can be uploaded to the Internet, another server or device, or stored locally with each camera on the camera rig 102.

The image processing system 106 includes an interpolation module 114, an optical flow module 116, a stitching module 118, a depth map generator 120, and a 3D generator module 122. The interpolation module 116 represents algorithms that can be used to sample portions of digital images and video and determine a number of interpolated images that are likely to occur between adjacent images captured from the camera rig 102, for example. In some implementations, the interpolation module 114 can be configured to determine interpolated image-fragments, image-portions, and/or vertical or horizontal image-strips between adjacent images. In some implementations, the interpolation module 114 can be configured to determine flow fields (and/or flow vectors) between related pixels in adjacent images. Flow fields can be used to compensate for both transformations that images have undergone and for processing images that have undergone transformations. For example, flow fields can be used to compensate for a transformation of a particular pixel grid of an obtained image. In some implementations, the interpolation module 114 can generate, by interpolation of surrounding images, one or more images that are not part of the captured images, and can interleave the generated images into the captured images to generate additional virtual reality content for a scene. For example, the interpolation module 116 can provide stitching of 2D (flat) photo/video spheres by reconstructing a view from virtual cameras in between the real (e.g., physical) cameras and selecting out the center ray of each view to make up one virtual camera image from the center of the sphere.

The optical flow module 116 can be configured to calculated dense optical flow between each triad of cameras. For example, the module 116 can calculate a three-way, pairwise optical flow between pairs of cameras that form a triangle on the spherical camera rig. The optical flow module 116 can calculate optical flow between a first camera and a second camera, between a second camera and a third camera, and between a third camera and the first camera. Each pair of cameras used in the calculations can be considered a stereo pair. In some implementations, optical flow calculations can be performed between a pair of cameras when flow vectors are pointed in any direction such that the vectors create a 2D quantity or arrangement. In some implementations, optical flow calculations can be performed when the flow vectors are restricted to one dimensions (e.g., horizontal stereo pair in which flow is horizontal)

Using the spherically shaped camera rig (or other 3D shaped-rig described herein) with multiple triads of cameras around the surface of the camera rig, the optical flow module 116 can produce an accurate scene surrounding the rig. For example, the optical flow module 116 can calculate the optical flow fields for particular captured image content and access stitching module 118 to stitch together a monoscopic panorama for the scene. This may reduce artifacts in video content. Generating monoscopic panoramas may include presenting the same image to both eyes of a user. This may appear 2D to the user. In some implementations, the stitching module 118 can stitch together a stereoscopic panorama that can provide a unique and different image to each eye associated with the user and such images may appear 3D to the user. As used herein, 3D content may be considered stereoscopic presented content and can indicate texture mapped onto a depth surface. Similarly, 2D content may be considered as monoscopic presented content indicating a texture mapped onto a flat or spherical surface, for example.

In some implementations, the module 114 and stitching module 118 can be used to generate a stereo spherical pair by taking non-center rays instead to introduce a panoramic twist or to, for example, introduce 3D effects in selected directions. A panoramic twist includes capturing rays of light for a first eye (left eye) with the rays deflected in a first direction and for a second eye (right eye) deflected in the opposite direction.

In general, the optical flow module 116 can use optical flow techniques to generate accurate mono-panoramas and stereo spherical panoramas (e.g., panoramic twist for omnidirectional stereo or mega stereo panoramas) by calculating optical flow between neighboring pairs of cameras in a spherical constellation of cameras. The constellation of cameras may be subject to a constraint of camera arrangement such that each point in space is visible to at least three cameras.

In some implementations, the camera rigs described herein can provide an advantage of reducing or removing artifacts (e.g., stitching errors/artifacts, discontinuities in objects on a camera boundary, missing data at a boundary, or doubling image content near a boundary, tearing objects, warping objects, removing content, etc.). The artifacts can be removed particularly well for video content representing moving image content. Removal of such artifacts is possible based on using the spherical camera rig with triads of cameras that include overlapped video/image content that can be used to correct stitching errors/artifacts by accessing overlapped image areas captured by the cameras, performing optical flow techniques, and recalculating image areas that are likely to have provided artifacts/errors.

The systems and methods described herein can be used to generate stereo 3D content at any point capture-able around a 3D spherically shaped camera rig (or other 3D shaped camera rig). Such broadly captured content enables a mathematical way to strategically place stereo 3D effects/video content in any location within still or video content, while removing the 3D or not providing 3D effects in other locations to save streaming bandwidth, processing power, and/or storage space.

The depth map generator 120 can access optical flow data (e.g., flow fields) pertaining to images captured with camera rig 102 and can use such flow data to calculate depth maps for the captured image content. For example, the depth map generator 120 can use image data from the many cameras on rig 102 that point in a variety of directions. The depth map generator 120 can access and employ stereo matching algorithms to calculate a depth value for each pixel represented in captured images. The views from the various cameras and the depth values can be combined into one spherical image which has R (red) values, G (green) values, B (blue) values and depth values for each pixel. In a viewer, the depth map generator 120 can perform a texture map of the RGB image to a surface in 3D space constructed by taking the depth value at every pixel, such that each point of the sphere has a radius equal to the depth value. This technique may be different than 3D spherical imagery techniques which typically use stereo pairs, rather than depth values and/or depth maps.

In general, the depth map generator 120 generates a depth map to be transmitted with spherical images. This transmission of a depth map with image content can provide the advantage of enabling a user to look in all directions and see 3D content, including at the poles (e.g., north above the user and south below the user). In addition, transmission of the depth map with image content can also enable the user to tilt her head and still see 3D effects. In one example, the user may be able to move around a small distance (e.g., in X, Y, and/or Z directions) from her nominal location and may be able to see the objects move in the correct way with appropriate parallax because the depth information is transmitted with the image content. Movement of the user within the VR space may refer to actual movement and system 100 can track user position.

Calculated optical flow data (including light field transmission data) can be combined with spherical video data and transmitted to an HMD device (or other device) to generate a left and right view for a user accessing the HMD device. In some implementations, the depth map generator 120 can provide separate and distinct spherical images and RGB data for each eye.

In some implementations, the optical flow interpolation can be performed by a computer system in communication with HMD device 106 and particular image content can be transmitted to the HMD device. In other implementations, the interpolation can be performed locally at the HMD device 106 in order to modify 3D image content for display. The flow data can be used to generate a left and right view for a left and right eye accessing the HMD device 106. The interpolation can be performed at the HMD device 106 because the system 106 provides combined data (e.g., spherical video data and optical flow data) at run time.

In some implementations, the 3D generator module 122 uses the optical flow data and depth map data to generate 3D regions within image content and provide such 3D effects to a user in the VR space. The 3D effects can be triggered to be placed in a manual or automatic fashion. For example, the 3D aspects of particular image content can be configured after capture in post-processing during directorial decisions. In particular, a director can determine that a scene in his VR space can be configured to provide a plane and helicopter sequence in which planes and helicopters are simulated to fly over a user in the VR space. The director may access a set of tools that include a 3D generator tool (not shown) to apply 3D effects to video content. In this example, the director can determine that the user will likely look to the sky upon hearing a plane or helicopter noise and can adjust the video image content using the 3D generator tool to provide the planes and helicopters as 3D content. In such an example, the director can determine that other surrounding video content may not offer much use to the user if provided as 3D content since the user may be looking up to the sky until the helicopters and planes pass. Accordingly, the director can configure the video content to adjust the 3D effects from the sky to another area in the video content when the sequence including helicopters and planes is scheduled to end.

Manually selecting portions of image content in which to include 3D effects can be triggered by a VR movie director, for example. The director may configure the image content based on the content or based on desired user response. For example, the director may wish to focus user attention somewhere within the content and can do so to provide useful access to data, artistic vision, or smooth transitions, just to name a few examples. The director can preconfigure 3D changes within the image content and adjust time in which such changes are displayed to the user in a VR space.

Automatically selecting portions of image content in which to include 3D effects can include using user input to trigger the effects. For example, the system 100 can be used to trigger 3D effects to appear within image content based on a detected head tilt of the user accessing the content in the VR space. Other user movements, content changes, sensors, and location-based effects can be used as input to trigger particular application or removal of 3D effects. In one example, a concert on a stage can be depicted in 3D in the VR space, while the crowd behind a user accessing the concert may be left in 2D because the user may be unlikely to turn around during the concert. However, if the user chooses to turn around, the 3D effects can be shifted from the stage/concert image content to the audience image content.

In the example system 100, the devices 106, 108, and 112 may be a laptop computer, a desktop computer, a mobile computing device, or a gaming console. In some implementations, the devices 106, 108, and 112 can be a mobile computing device that can be disposed (e.g., placed/located) within the HMD device 110. The mobile computing device can include a display device that can be used as the screen for the HMD device 110, for example. Devices 106, 108, and 112 can include hardware and/or software for executing a VR application. In addition, devices 106, 108, and 112 can include hardware and/or software that can recognize, monitor, and track 3D movement of the HMD device 110, when these devices are placed in front of or held within a range of positions relative to the HMD device 110. In some implementations, devices 106, 108, and 112 can provide additional content to HMD device 110 over network 104. In some implementations, devices 102, 106, 108, 110, and 112 can be connected to/interfaced with one or more of each other either paired or connected through network 104. The connection can be wired or wireless. The network 104 can be a public communications network or a private communications network.

The system 100 may include electronic storage. The electronic storage can include non-transitory storage media that electronically stores information. The electronic storage may be configured to store captured images, obtained images, pre-processed images, post-processed images, etc. Images captured with any of the disclosed camera rigs can be processed and stored as one or more streams of video, or stored as individual frames. In some implementations, storage can occur during capture and rendering can occur directly after portions of capture to enable faster access to panoramic stereo content earlier than if capture and processing were concurrent.

Figure 2:
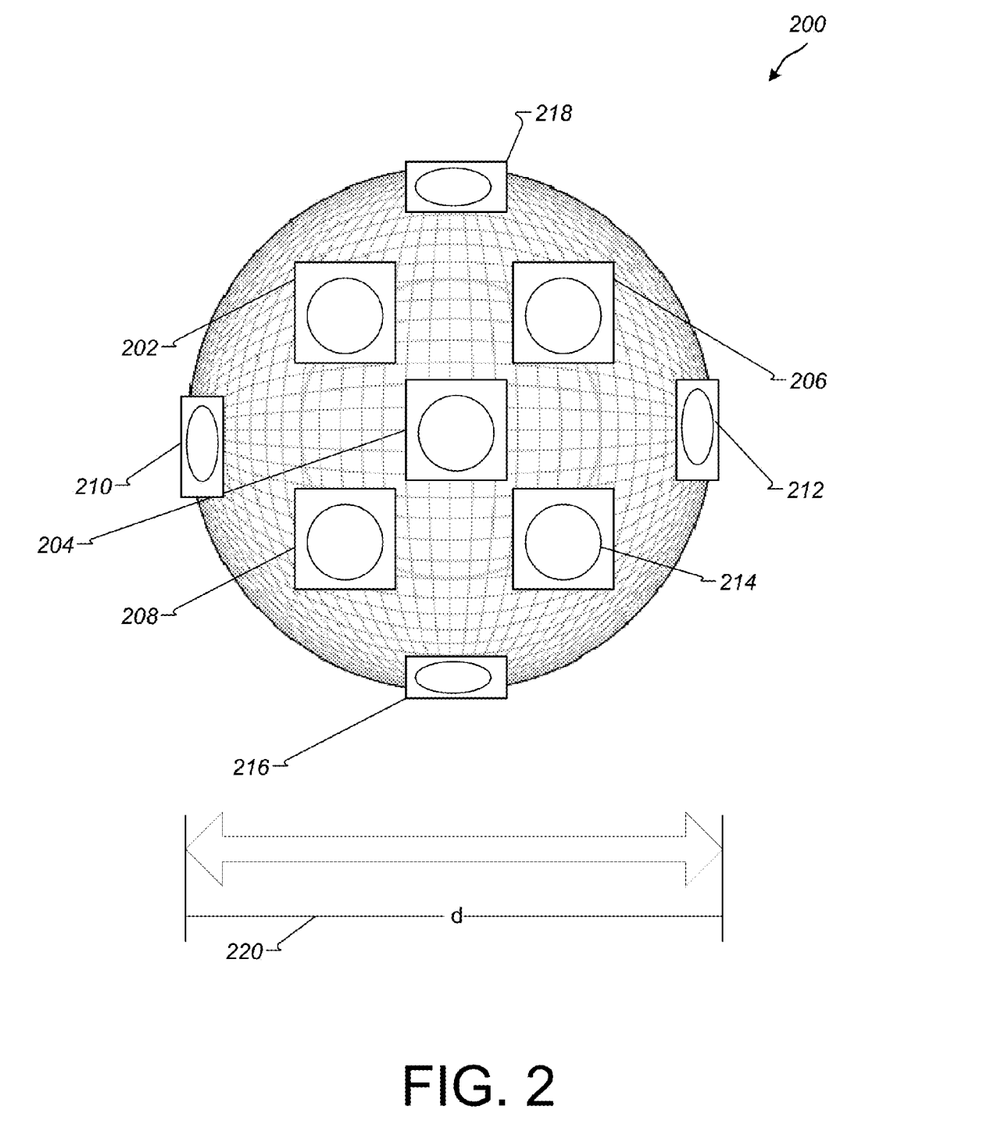
FIG. 2 is a diagram depicting an example spherical camera rig configured to capture images of a scene for use in generating 3D portions of video content.

FIG. 2 is a diagram depicting an example spherical camera rig 200 configured to capture images of a scene for use in generating 3D portions of video content. The camera rig 200 includes a number of cameras 202, 204, 206, 208, 210, 212, 214, 216, and 218. The cameras 202-218 are shown affixed to the sphere-shaped rig. Additional cameras are not depicted in FIG. 2 for the other angles of the sphere, but are configured to collect image content from such other angles. The cameras 202-218 are arranged such that each of three cameras can function together to capture image content for each point/area surrounding the sphere. Capturing each point/area includes capturing still images or video images of scenes surrounding rig 200. The cameras 202-218 can be placed against the sphere (or other shaped rig). In some implementations, the cameras 202-218 (and/or more or fewer cameras) can be placed at an angle to the sphere to capture additional image content.

In a non-limiting example, cameras 202, 204, and 206 can be arranged to capture images of an area of scenery surrounding the sphere. The captured images can be analyzed and combined (e.g., stitched) together to form a viewable scene for a user in a VR space. Similarly, images captured with camera 204 can be combined with images captured with camera 202 and 208 to provide another area of a viewable scene. Images captured with cameras 202, 208, and 210 can be combined in the same fashion, as can cameras 206, 212, and 214. Wider spaces between cameras can also be possible. For example, images captured with camera 210, 212, and 216 can be combined to provide image content for scenes (e.g., points) viewable from one-half of a hemisphere of rig 200. A similar combination can be made with cameras 202, 212, and 218 to provide viewable images from another half of a hemisphere of sphere 200. In some implementations, the camera rig 200 can have a diameter 220 of anywhere from about 0.15 meters to about 1.5 meters. In one non-limiting example, the diameter 220 is about 0.2 to about 0.9 meters. In another non-limiting example, the diameter 220 is about 0.5 to about 0.6 meters. In some implementation, spacing between cameras can be from about 0.05 meters to about 0.6 meters. In one non-limiting example, the spacing between cameras is about 0.1 meters.

In some implementations, a constellation of cameras can be arranged on such a spherical camera rig (or other 3D shaped rig) in a number of directions to capture each point out in space. That is, each point in space may be captured by at least three cameras. In one example, a number of cameras can be arranged on the sphere as close as possible (e.g., on each corner of an icosahedron, on each corner of a geodesic dome, etc.). A number of rig arrangements will be described below. Each arrangement described in this disclosure can be configured with the aforementioned or other diameters and distances between cameras.

Figure 3:
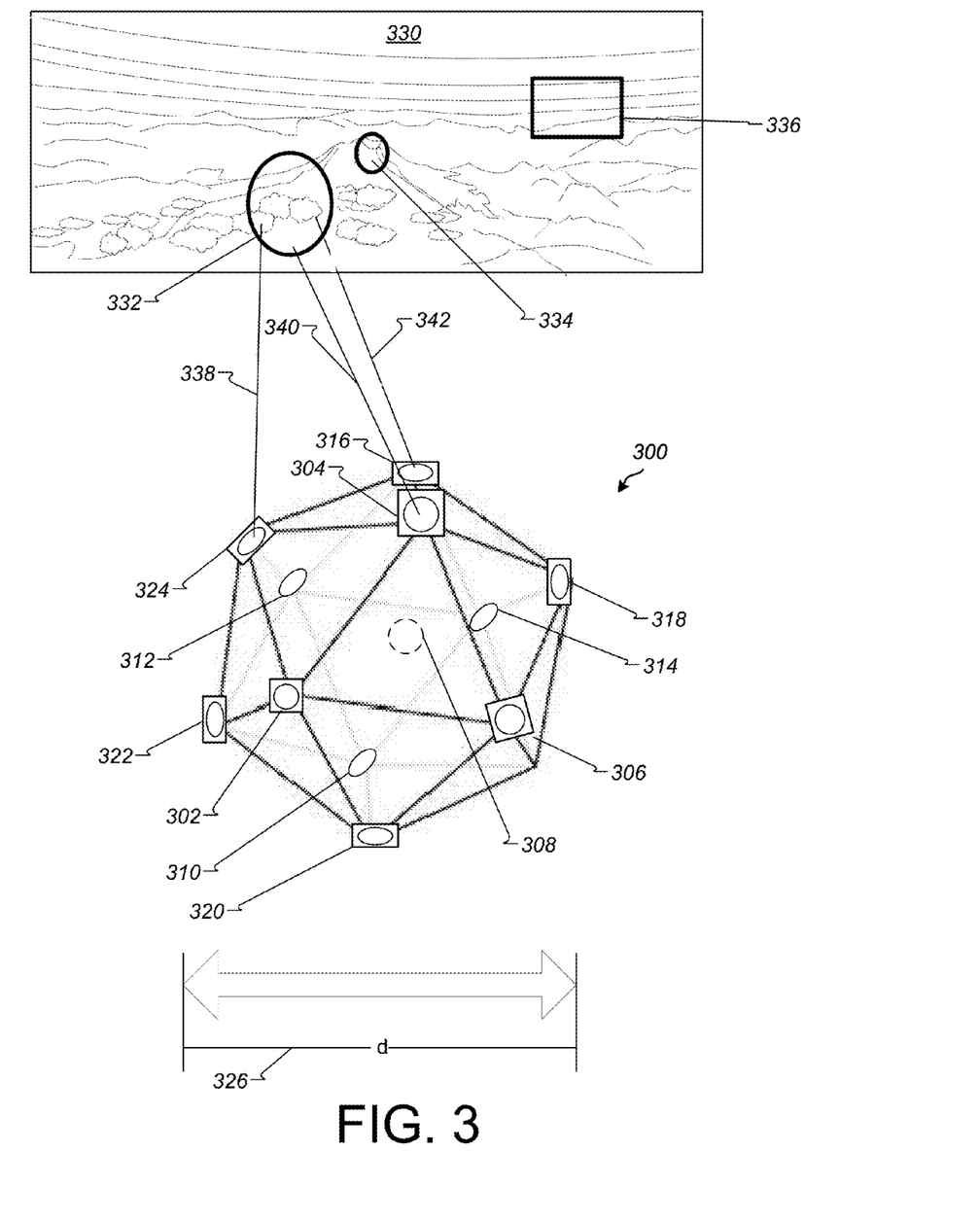
FIG. 3 is a diagram depicting an example icosahedral camera rig configured to capture images of a scene for use in generating 3D portions of video content.

Referring to FIG. 3, an icosahedral camera rig 300 is depicted. A number of cameras can be mounted on the camera rig 300. Cameras can be placed at the points of the triangles in the icosahedron, as illustrated by cameras 302, 304, and 306. Alternatively or additionally, cameras can be placed in the center of the triangles of the icosahedron, as illustrated by cameras 308, 310, 312, and 314. Cameras 316, 318, 320, 322, and 324 are shown around the edges of the icosahedron. Additional cameras can be included around the icosahedron. Camera spacing and diameter 326 may be configured similar to other camera rigs described throughout this disclosure. In some implementations, cameras can be placed tangential to the camera rig. In other implementations, each camera can be placed at various angles to the camera rig.

The camera rig 300 may be stationary and configured with cameras 302-324 that have a wide field of view. For example, the cameras 302-324 can capture a field of view of about 150 degrees to about 180 degrees. The cameras 302-324 may have fish-eye lens to capture wider views. In some implementations, adjacent cameras (e.g., 302 and 320) can function as a stereo pair and a third camera 306 can be paired with each of cameras 302 and 320 to produce a stereo triad of cameras in which optical flow can be calculated from images obtained from the cameras 302, 306, and 320. Similarly, the following cameras can produce combinable images to produce 3D images (cameras 302, 312, and 324), (cameras 302, 304, and 324), (cameras 304, 316, and 324), (cameras 302, 306, and 320), (cameras 304, 316, and 318), (cameras 304, 306, and 318), and (cameras 310, 312, and 314), among other camera combinations that are not depicted in FIG. 3.

In some implementations, camera rig 300 (and other cameras described herein) can be configured to capture images of a scene, such as scene 330. The images may include portions of scene 330, video of scene 330, or panoramic video of scene 330. In operation, the systems described herein can retrieve such captured images and can process the content to display particular regions within the captured images in a three-dimensional format. For example, the systems described herein can determine a region within a plurality of images captured with a plurality of cameras in which to transform two-dimensional data into three-dimensional data. Example regions include region 332, 334, and 336. Such regions can be user-selected, director selected, or automatically selected. In some implementations, the regions can be selected after the images have been captured and during display of the images in an HMD device. Other regions can be selected throughout scene 330 and regions 332, 334, and 336 represent example regions. Region 332 depicts a region captured by rig 300 using capture paths 338, 340, and 342.

Figure 4:
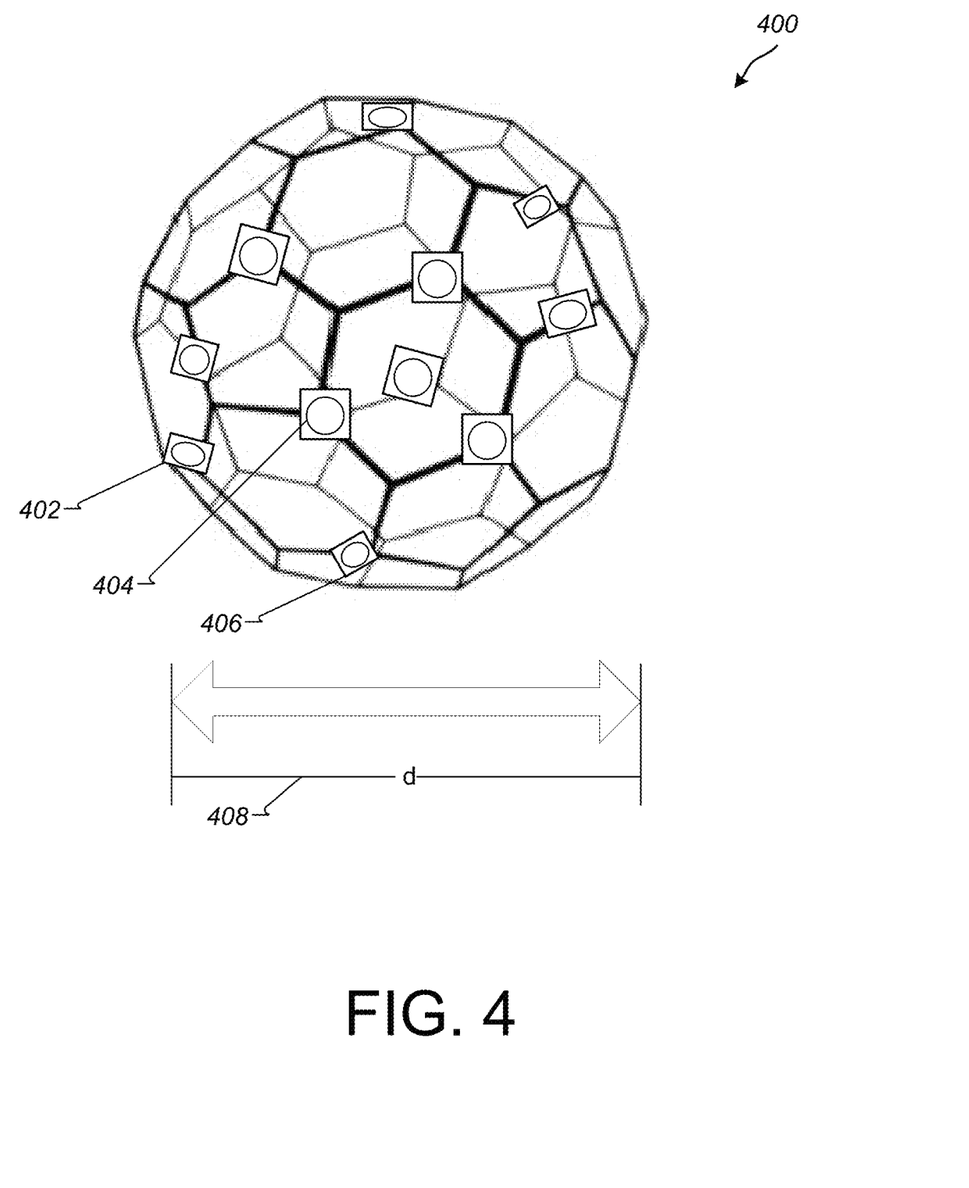
FIG. 4 is a diagram depicting an example hexagonal sphere camera rig configured to capture images of a scene for use in generating 3D portions of video content.

Referring to FIG. 4 hexagonal sphere camera rig 400 is depicted. A number of cameras can be mounted on the camera rig 400. Cameras can be placed at the points of the hexagons, or along a side of the hexagons, as illustrated by cameras 402, 404, and 406. Alternatively or additionally, cameras can be placed in the center of the hexagons. Additional cameras can be included around the hexagonal sphere camera rig 400. Camera spacing and diameter 408 may be configured similar to other camera rigs described throughout this disclosure.

Figure 5:
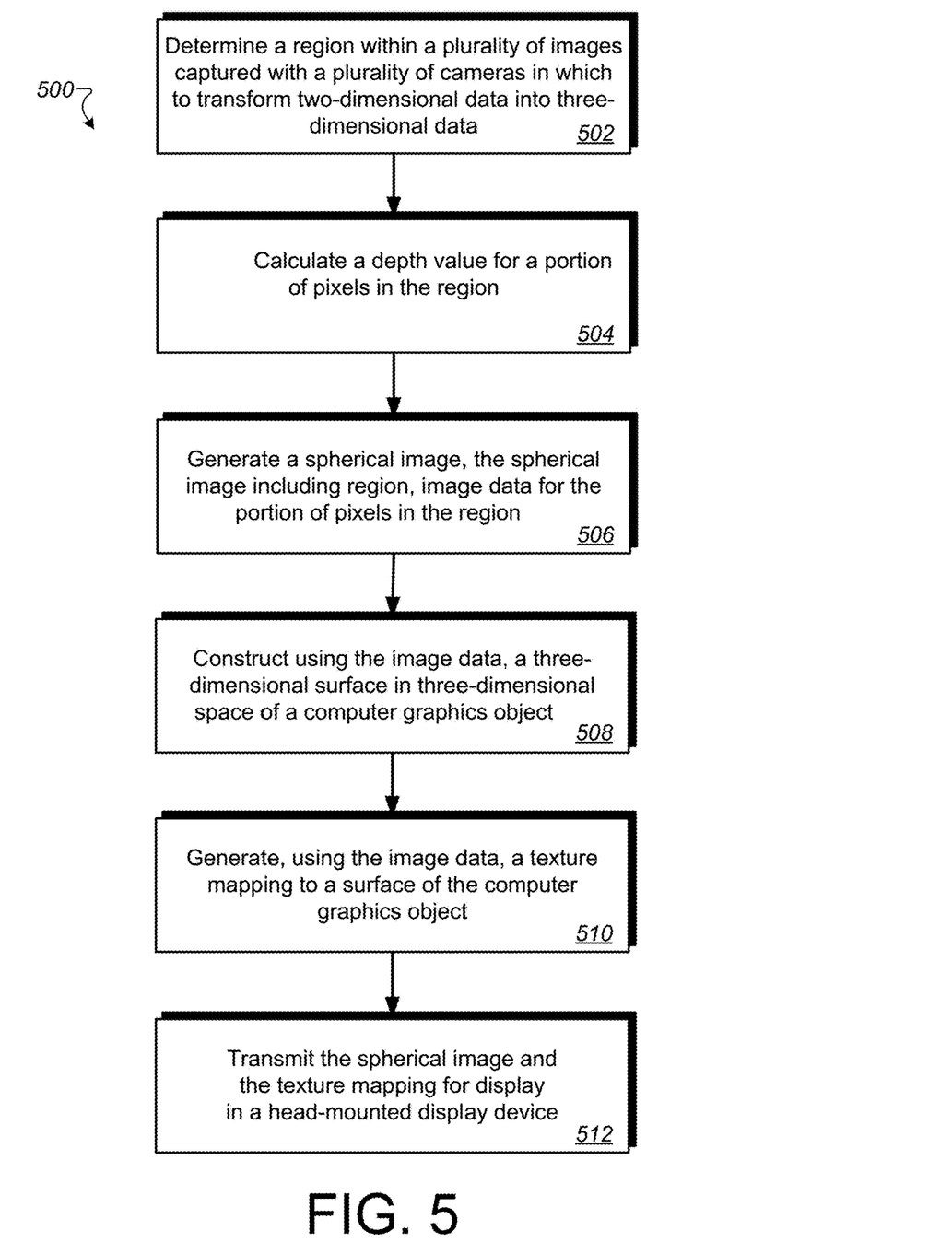
FIG. 5 is a flow chart diagramming one embodiment of a process to generate video content.

FIG. 5 is a flow chart diagramming one embodiment of a process 500 to provide areas of 3D image content to a user accessing VR space. The process 500 can use captured images to retrieve and/or calculate image data including, but not limited to RGB data and can use such data to calculate depth value data associated with a portion of pixels in a region of an image. The system can convert, using the image data, a two-dimensional version of the region into a three-dimensional version of the region in order to provide the three dimensional version of the region for display in the head-mounted display device.

At block 502, the system 100 can determine a region within a plurality of images captured with a plurality of cameras in which to transform two-dimensional data into three-dimensional data. The plurality of images may be still images, video, portions of images and/or portions of video. In some implementations, the plurality of images may include video image content captured with a number of cameras mounted on a spherically shaped camera rig. In some implementations, determining a region in which to transform two-dimensional data into three-dimensional data is performed automatically based at least in part on user input detected at the head-mounted display, such as display device 106. The user input may include a head turn, a change in eye gaze direction, a hand gesture, a location change, etc. In some implementations, determining a region can occur manually based on a VR film director choice of providing 3D regions within particular video or images.

At block 504, the system 100 can calculate a depth value for a portion of pixels in the region. In some implementations, the system 100 can calculate a depth value for each pixel in the region. Calculating a depth value may include comparing a number of regions captured by the plurality of cameras. For example, three images of a region 332 can be captured by three cameras at different angles to the region 332 (e.g., cameras 304, 316, and 324). The system 100 can compare pixel intensity and location amongst the three images to determine accuracy of pixel intensity. Using the comparisons, a depth value can be calculated for one or more pixels in the region 332. Other reference objects can be compared in the scene to ascertain accuracy of pixel intensity.

At block 506, the system 100 can generate a spherical image. Generating a spherical image can include calculating a spherically formatted version of the image using the image data.

At block 508, the system 100 can construct, using the image data, a three-dimensional surface in three-dimensional space of a computer graphics object generated by an image processing system. For example, the portion of pixels may be represented on the surface of the computer graphics object with a radius equal to a corresponding depth value associated with one or more of the portion of pixels in the region. The computer graphics object may be a sphere, an icosahedron, a triangle, or other polygon.

At block 510, the system 100 can generate, using the image data, a texture mapping to a surface of the computer graphics object. The texture mapping may include mapping the image data to the surface of the computer graphics object. At block 512, the system 100 can transmit the spherical image and the texture mapping for display in a head-mounted display device.

At block 512, the system 100 can transmit the spherical image and the texture mapping for display in a head-mounted display device. In some implementations, the process 500 may include generating an additional spherical image and texture mapping for the region, generating a left eye view by combining a portion of the image data and the spherical image. The process 500 can additionally include generating a right eye view by generating additional image data and combining the additional image data and the additional spherical image. The process 500 can additionally include displaying the left eye view and right eye view in the head-mounted display device. In some implementations, the image data includes depth value data and RGB data for at least some of the portion of pixels in the region.

The display may include 3D image content in the region. The method may also include generating an additional spherical image and texture mapping, generating a left eye view by combining a portion of the depth values with the RGB data and the spherical image, generating a right eye view by generating additional depth values and combining the additional depth values with updated RGB data and the additional spherical image, and displaying the left eye view and right eye view in the head-mounted display device.

In some implementations, the systems described herein may be configured to obtain images with any number of cameras. For example, cameras 402, 404, and 406 (FIG. 4) can be used to capture particular images. The systems described herein can use one or more of the captured images to generate at least two updated images for provision to a head mounted display device. The updated images may be configured to provide 2D or 3D content. The 3D content can be configured in portions of the updated images or all of the updated images. The updated images may be generated using virtual camera viewpoints generated from images captured from physical cameras, such as cameras 402, 404, and 406, for example. The viewpoints may pertain to one or more offsets selected to provide specific 3D content in particular regions of an image.

In some implementations, the updated images include image data generated from particular offsets. For example, one updated image may include image content in which a portion of the pixels in the content are captured from a leftward facing offset of one or more cameras 402, 404, or 406. Another updated image may include image content in which a portion of the pixels in the content are captured from a rightward facing offset of one or more cameras 402, 404, or 406.

In general, the updated images may include offset image content, virtual content, content from various camera angles, manipulated image content, and combinations thereof. In some implementations, the updated images may be generated by interpolating a viewpoint of at least one virtual camera. Interpolating may include sampling a plurality of pixels in captured images, generating virtual content using optical flow, and adapting the virtual content to be placed within at least one of the updated images.

The virtual camera may be configured to capture content in a leftward offset from a predefined centerline and to capture content in a rightward offset from the predefined centerline. The leftward offset and the rightward offset may be modifiable and functional to adapt the images for accurate display in the head mounted display.

The virtual camera may be configured utilize content captured with one or more physical cameras and adapt the content to be provided from an interpolated viewpoint. In particular, a virtual camera can be adapted to capture any offset (angle) generated by one or more physical cameras. The offset may define the viewpoint. The offset may be defined from a physical camera centerline or from a centerline defined between two physical cameras. The interpolation of content can be tuned to generate content with any offset from either centerline and the amount of offset and direction can be selected to ensure accurate portrayal of a three dimensional effect in an image provided in an HMD display device.

Upon generating the at least two updated images, the systems described herein may be configured to map a first image to a first spherical surface to generate a first spherical image for provision to a left eyepiece of a head mounted display. Similarly, the systems described herein may be configured to map a second image to a second spherical surface to generate a second spherical image for provision to a right eyepiece of the head mounted display. Mapping of the first image and the mapping of the second image may include applying a texture to the first image and the second image. The application of the texture may include assigning pixel coordinates from the first image to the first spherical surface and assigning pixel coordinates from the second image to the second spherical surface, as described in detail above.

Figure 6:
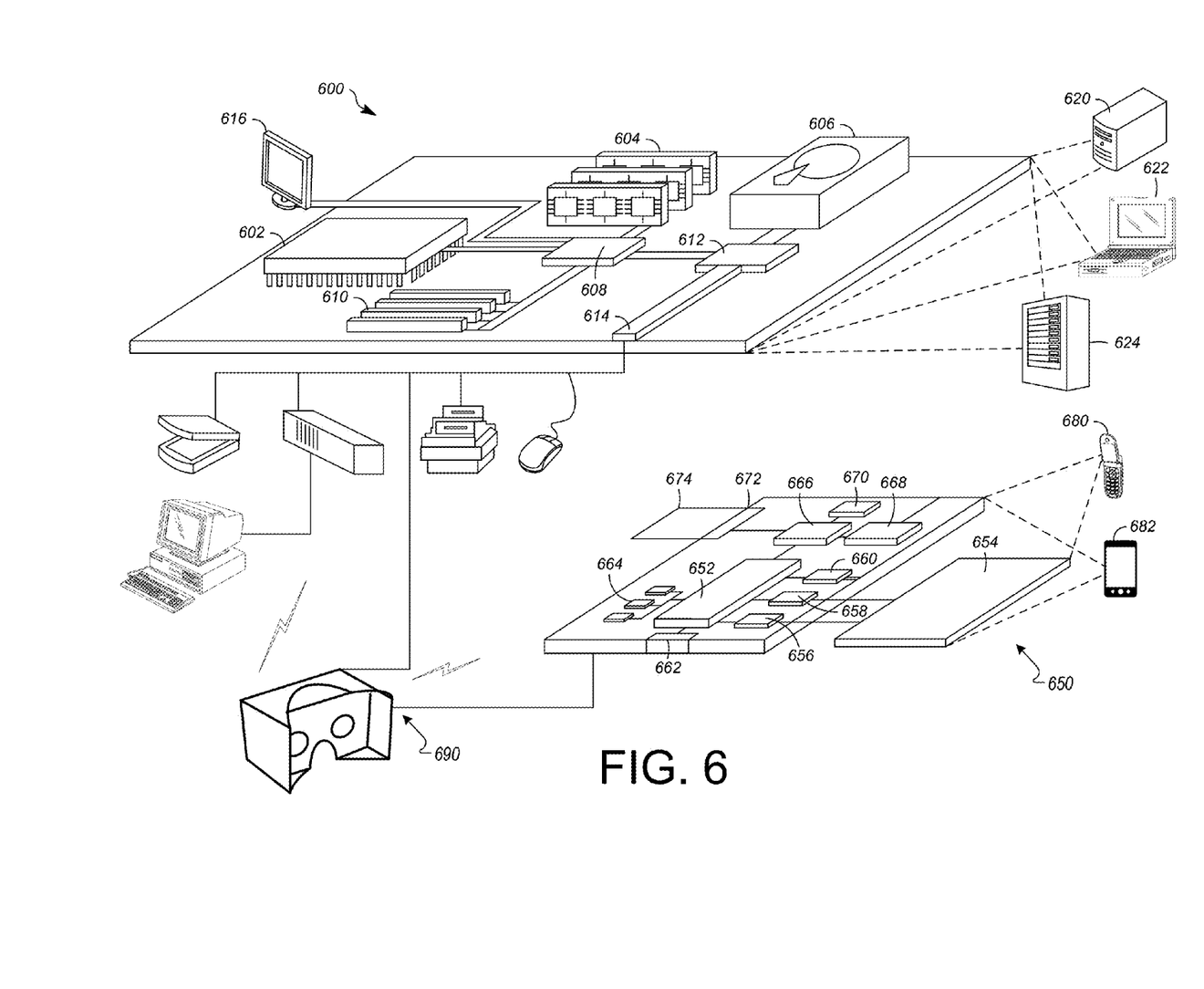
FIG. 6 shows an example of a computer device and a mobile computer device that can be used to implement the techniques described herein.

FIG. 6 shows an example of a generic computer device 600 and a generic mobile computer device 650, which may be used with the techniques described here. Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. In addition, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 6 can include sensors that interface with a virtual reality (VR headset 690). For example, one or more sensors included on a computing device 650 or other computing device depicted in FIG. 6, can provide input to VR headset 690 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the VR space that can then be used as input to the VR space. For example, the computing device 650 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 650 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the VR space can cause a particular action to occur in the VR space.

In some implementations, a touchscreen of the computing device 650 can be rendered as a touchpad in VR space. A user can interact with the touchscreen of the computing device 650. The interactions are rendered, in VR headset 690 for example, as movements on the rendered touchpad in the VR space. The rendered movements can control objects in the VR space.

In some implementations, one or more output devices included on the computing device 650 can provide output and/or feedback to a user of the VR headset 690 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the VR space. In the example of the laser pointer in a VR space, the computing device 650 appears as a virtual laser pointer in the computer-generated, 3D environment. As the user manipulates the computing device 650, the user in the VR space sees movement of the laser pointer. The user receives feedback from interactions with the computing device 650 in the VR space on the computing device 650 or on the VR headset 690.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further implementations are summarized in the following examples.

Example 1

A computer-implemented method comprising: determining a region within a plurality of images captured with a plurality of cameras in which to transform two-dimensional data into three-dimensional data; calculating a depth value for a portion of pixels in the region; generating a spherical image, the spherical image including image data for the portion of pixels in the region; constructing, using the image data, a three-dimensional surface in three-dimensional space of a computer graphics object generated by an image processing system; generating, using the image data, a texture mapping to a surface of the computer graphics object, the texture mapping including mapping the image data to the surface of the computer graphics object; and transmitting the spherical image and the texture mapping for display in a head-mounted display device Example 2

The method of example 1, wherein the portion of pixels are represented on the surface of the computer graphics object with a radius equal to a corresponding depth value associated with one or more of the portion of pixels in the region.

Example 3

The method of example 1 or 2, further comprising: generating an additional spherical image and texture mapping associated with the region; generating a left eye view by combining a portion of the image data and the spherical image; generating a right eye view by generating additional image data and combining the additional image data and the additional spherical image; displaying the left eye view and right eye view in the head-mounted display device; and wherein the image data includes depth value data and RGB data for at least some of the portion of pixels in the region.

Example 4

The method of one of examples 1 to 3, wherein the plurality of images includes video content and wherein the image data includes RGB data and depth value data associated with the portion of pixels, the system further comprising: converting, using the image data, a two-dimensional version of the region into a three-dimensional version of the region; and providing, for display in the head-mounted display device, the three dimensional version of the region.

Example 5

The method of one of examples 1 to 4, wherein the plurality of images are captured with a plurality of cameras mounted on a spherically shaped camera rig.

Example 6

The method of one of examples 1 to 5, wherein determining a region in which to transform two-dimensional data into three-dimensional data is performed automatically based at least in part on user input detected at the head-mounted display.

Example 7

The method of example 6, wherein the user input includes a head turn and the three-dimensional data is used to generate a three-dimensional portion in at least one of the plurality of images corresponding to a view.

Example 8

The method of example 6 or 7, wherein the user input includes a change in eye gaze direction and the three dimensional data is used to generate a three dimensional portion in at least one of the plurality of images in a line of sight of the user.

Example 9

A computer implemented system comprising: at least one processor; memory storing instructions that, when executed by the at least one processor, cause the system to perform operations including, determine a region within a plurality of images captured with a plurality of cameras in which to transform two-dimensional data into three-dimensional data; calculate a depth value for a portion of pixels in the region; generate a spherical image, the spherical image including image data for the portion of pixels in the region; construct, using the image data, a three-dimensional surface in three-dimensional space of a computer graphics object generated by an image processing system; generate, using the image data, a texture mapping to a surface of the computer graphics object, the texture mapping including mapping the image data to the surface of the computer graphics object; and transmit the spherical image and the texture mapping for display in a head-mounted display device.

Example 10

The system of example 9, further comprising: generating an additional spherical image and texture mapping; generating a left eye view by combining a portion of the image data and the spherical image; generating a right eye view by generating additional image data and combining the additional image data and the additional spherical image; displaying the left eye view and right eye view in the head-mounted display device; and wherein the image data includes depth value data and RGB data for at least some of the portion of pixels in the region.

Example 11

The system of example 9 or 10, wherein the plurality of images includes video content and wherein the image data includes RGB data and depth value data associated with the portion of pixels, the system further comprising; converting, using the image data, a two-dimensional version of the region into a three-dimensional version of the region; and providing, for display in the head-mounted display device, the three dimensional version of the region.

Example 12

The system of one of examples 9 to 11, wherein the plurality of images are captured with a plurality of cameras mounted on a spherically shaped camera rig.

Example 13

The system of one of examples 9 to 12, wherein determining a region in which to transform two-dimensional data into three-dimensional data is performed automatically based at least in part on user input detected at the head-mounted display.

Example 14

The system of example 13, wherein the user input includes a change in eye gaze direction and the three-dimensional data is used to generate a three-dimensional portion in at least one of the plurality of images in a line of sight of the user.

Example 15

A computer-implemented method comprising: obtaining a plurality of images with a plurality of cameras; generating at least two updated images for the plurality of images, the at least two updated images generated by interpolating a viewpoint for at least one virtual camera configured to capture content in a leftward offset from a predefined centerline and to capture content in a rightward offset from the predefined centerline, mapping a first image in the at least two updated images to a first spherical surface to generate a first spherical image for provision to a left eyepiece of a head mounted display; mapping a second image in the at least two updated images to a second spherical surface to generate a second spherical image for provision to a right eyepiece of the head mounted display; and displaying the first spherical image in the left eyepiece of the head mounted display and displaying the second spherical image in the right eyepiece of the head mounted display.

Example 16

The method of example 15, wherein the at least one virtual camera is configured to use content captured using one or more physical cameras and adapt the content to be provided from the viewpoint.

Example 17

The method of example 15 or 16, wherein: the mapping of the first image includes applying a texture to the first image by assigning pixel coordinates from the first image to the first spherical surface; and the mapping of the second image includes applying a texture to the second image by assigning pixel coordinates from the second image to the second spherical surface.

Example 18

The method of one of example 15 to 17, wherein interpolating a viewpoint includes sampling a plurality of pixels in the plurality of images, generating virtual content using optical flow, and placing the virtual content within at least one of the at least two updated images.

Example 19

The method of example 18, wherein the at least two spherical images include an RGB image having at least a portion of the plurality of pixels included in the content captured in the leftward offset and an RGB image having at least a portion of the plurality of pixels included in the content captured in the rightward offset.

Example 20

The method of one of examples 15 to 19, wherein the leftward offset and the rightward offset are modifiable and are functional to adapt a display accuracy of the first image and the second image in the head mounted display.

What is claimed is:

1. A computer-implemented method comprising:
   determining a region within a plurality of images in which to transform two-dimensional data into three-dimensional data;
   calculating a depth value for a portion of pixels in the region;
   generating a spherical image, the spherical image including image data for the portion of pixels in the region;
   constructing, using the image data, a three-dimensional surface corresponding to a computer graphics object generated by an image processing system;
   generating, using the image data, a texture mapping that maps the image data to the surface of the computer graphics object; and
   transmitting the spherical image and the texture mapping for display in a head-mounted display device.

2. The method of claim 1, wherein the portion of pixels are represented on the surface of the computer graphics object with a radius equal to a corresponding depth value associated with one or more of the portion of pixels in the region.

3. The method of claim 1, further comprising:
   generating an additional spherical image and texture mapping associated with the region;
   generating a left eye view by combining a portion of the image data and the spherical image;
   generating a right eye view by generating additional image data and combining the additional image data and the additional spherical image;
   displaying the left eye view and right eye view in the head-mounted display device; and
   wherein the image data includes depth value data and RGB data for at least some of the portion of pixels in the region.

4. The method of claim 1, wherein the plurality of images includes video content and wherein the image data includes at least RGB data and depth value data associated with the portion of pixels, the method further comprising:
   converting, using the image data, a two-dimensional version of the region into a three-dimensional version of the region; and
   providing, for display in the head-mounted display device, the three dimensional version of the region.

5. The method of claim 1, wherein the plurality of images are captured with a plurality of cameras mounted on a spherically shaped camera rig.

6. The method of claim 1, wherein determining a region in which to transform two-dimensional data into three-dimensional data is performed automatically based at least in part on user input detected at the head-mounted display.

7. The method of claim 6, wherein the user input includes a head turn and the three-dimensional data is used to generate a three-dimensional portion in at least one of the plurality of images corresponding to a view.

8. The method of claim 6, wherein the user input includes a change in eye gaze direction and the three dimensional data is used to generate a three dimensional portion in at least one of the plurality of images in a line of sight of the user.

9. A computer implemented system comprising:
at least one processor;
memory storing instructions that, when executed by the at least one processor, cause the system to perform operations including,
determine a region within a plurality of images in which to transform two-dimensional data into three-dimensional data;
calculate a depth value for a portion of pixels in the region;
generate a spherical image, the spherical image including image data for the portion of pixels in the region;
construct, using the image data, a three-dimensional surface corresponding to a computer graphics object generated by an image processing system;
generate, using the image data, a texture mapping that maps the image data to the surface of the computer graphics object;
and
transmitting the spherical image and the texture mapping for display in a head-mounted display device.

10. The system of claim 9, wherein the operations further comprise:
generating an additional spherical image and texture mapping;
generating a left eye view by combining a portion of the image data and the spherical image;
generating a right eye view by generating additional image data and combining the additional image data and the additional spherical image;
displaying the left eye view and right eye view in the head-mounted display device; and
wherein the image data includes depth value data and RGB data for at least some of the portion of pixels in the region.

11. The system of claim 9, wherein the plurality of images includes video content and wherein the image data includes at least RGB data and depth value data associated with the portion of pixels, the operations further comprising:
converting, using the image data, a two-dimensional version of the region into a three-dimensional version of the region; and
providing, for display in the head-mounted display device, the three dimensional version of the region.

12. The system of claim 9, wherein the plurality of images are captured with a plurality of cameras mounted on a spherically shaped camera rig.

13. The system of claim 9, wherein determining a region in which to transform two-dimensional data into three-dimensional data is performed automatically based at least in part on user input detected at the head-mounted display.

14. The system of claim 13, wherein the user input includes a change in eye gaze direction and the three-dimensional data is used to generate a three-dimensional portion in at least one of the plurality of images in a line of sight of the user.

15. A computer-implemented method comprising:
obtaining a plurality of images with a plurality of cameras;
generating at least two updated images for the plurality of images, the at least two updated images generated by interpolating a viewpoint for at least one virtual camera configured to capture content in a leftward offset from a predefined centerline and to capture content in a rightward offset from the predefined centerline;
mapping a first image in the at least two updated images to a first spherical surface to generate a first spherical image for provision to a left eyepiece of a head mounted display;
mapping a second image in the at least two updated images to a second spherical surface to generate a second spherical image for provision to a right eyepiece of the head mounted display; and
displaying the first spherical image in the left eyepiece of the head mounted display and displaying the second spherical image in the right eyepiece of the head mounted display.

16. The method of claim 15, wherein the at least one virtual camera is configured to use content captured using one or more physical cameras and adapt the content to be provided from the viewpoint.

17. The method of claim 15, wherein:
the mapping of the first image includes applying a texture to the first image by assigning pixel coordinates from the first image to the first spherical surface; and
the mapping of the second image includes applying a texture to the second image by assigning pixel coordinates from the second image to the second spherical surface.

18. The method of claim 15, wherein interpolating a viewpoint includes sampling a plurality of pixels in the plurality of images, generating virtual content using optical flow, and placing the virtual content within at least one of the at least two updated images.

19. The method of claim 18, wherein the at least two spherical images include an RGB image having at least a portion of the plurality of pixels included in the content captured in the leftward offset and an RGB image having at least a portion of the plurality of pixels included in the content captured in the rightward offset.

20. The method of claim 15, wherein the leftward offset and the rightward offset are modifiable and are functional to adapt a display accuracy of the first image and the second image in the head mounted display.

* * * * *